United States Patent [19]

Asano et al.

[11] 3,941,837

[45] Mar. 2, 1976

[54] METHOD OF TREATING AN AQUEOUS SOLUTION OF ACRYLAMIDE

[75] Inventors: Shiro Asano; Kiyotaka Yoshimura; Masao Hashimoto, all of Mobara, Japan

[73] Assignee: Mitsui Toatsu Chemicals, Incorporated, Tokyo, Japan

[22] Filed: May 28, 1974

[21] Appl. No.: 473,551

[30] Foreign Application Priority Data
June 5, 1973   Japan.............................. 48-62511

[52] U.S. Cl............................................. 260/561 N
[51] Int. Cl.²........................................ C07C 103/08
[58] Field of Search.............................. 260/561 N

[56] References Cited
UNITED STATES PATENTS

| | | | |
|---|---|---|---|
| 3,620,991 | 11/1971 | Wasser........................ | 260/29.6 Z |
| 3,624,154 | 11/1971 | Robbins et al.................. | 260/561 N |
| 3,699,081 | 10/1972 | Iwashita......................... | 260/561 N |

FOREIGN PATENTS OR APPLICATIONS 2,151,379   4/1973   France

*Primary Examiner*—C. Davis
*Attorney, Agent, or Firm*—Lane, Aitken, Dunner & Ziems

[57] ABSTRACT

A method of purifying an aqueous solution of acrylamide, which has been formed by reacting acrylonitrile with water in the presences of the metallic copper catalyst, and which contains cuprous ions, comprising treating said aqueous solution in a reaction zone which is substantially free of an oxygen containing gas or liquid.

18 Claims, No Drawings

METHOD OF TREATING AN AQUEOUS SOLUTION OF ACRYLAMIDE

BACKGROUND OF THE INVENTION

1. Field of the Invention

This invention relates to a method of treating an aqueous solution of crude acrylamide, which has been obtained by catalytic hydration of acrylonitrile and contains cuprous ions, through various steps such as distillation, concentration, filtration, precipitation, active carbon treatment and ion exchange treatment.

2. Description of the Prior Art

As a new commercially attractive method for producing acrylamide, it has been proposed to obtain acrylamide in the form of an aqueous solution directly from acrylonitrile by catalytic hydration (as disclosed, for instance, in U.S. Pat. No. 3,631,104 and Belgian Pat. No. 753,365). The aqueous solution of acrylamide removed from the reactor is marketed in that form or after crystallization. In either case, the product from the reactor is refined or purified while it is an aqueous solution to enhance its commercial value.

The catalytic hydration method is quite different from the sulfuric acid method conventionally used in the prior art for the production of acrylamide wherein a large amount of a sulfate is formed as by-product. Hence, a technique unique to the purification treatment for an aqueous solution of crude acrylamide produced according to the catalytic hydration method is still unknown.

Catalysts utilizable for the aforementioned catalytic hydration method are composed essentially of metallic copper as the effective ingredient. Illustrative of such catalysts are metallic copper catalysts such as Raney copper, reduced copper and Ullmann copper. The catalytic hydration reaction is advantageously carried out in a liquid phase in which case a certain kind of copper salt may be used as co-catalyst in addition to the above-mentioned catalyst (See, for example, Belgian Pat. No. 784,799). In this reaction, water is generally used in an excess proportion to acrylonitrile, for example, in an amount of 50 – 90 % by weight. An adequate solvent may be added to improve the compatibility of acrylonitrile with water. The reaction temperature is preferably within the range of 50°– 200°C, with the range of 50°– 150°C being most preferable for usual cases.

An aqueous solution of crude acrylamide obtained according to the aforementioned method usually contains 1 – 1000 ppm, more generally 5 – 500 ppm of copper ions, coming from the catalyst and co-catalyst, the majority of which exists in the form of cuprous ion. A variety of treatments are required for the crude product, such as distillation or concentration to remove unreacted acrylonitrile, water and solvents, filtration or precipitation to remove catalyst particles or other particles contained in the product, a treatment with active carbon to decolor the aqueous solution, crystallization to obtain crystals and ion-exchange to remove salts containing copper ions.

In this connection, it is a very significant fact that acrylamide is a compound capable of readily undergoing natural polymerization. It will be readily understood that the occurrence of polymerization here would lead to such undesired results as lowering of the purification performance or degradation of the product quality due to contamination with polmerized acrylamide.

It has been well known from an early date that copper ions can serve as stabilizer for acrylamide. Experiments reveal that the cuprous ion is so effective in it stabilizing effect that no other stabilizer is required even under such severe reaction conditions as operations at a temperature exceeding 150°C. Nevertheless, when the aqueous solution of crude acrylamide obtained by that reaction is fed to the purification process as mentioned above, very grave and unexpected polymerization troubles occurred for instance, gelation of the solution within a storage tank due to polymerization or increase in the viscosity of the product solution.

To avoid the polymerization of acrylamide in the aforementioned purification process, it is possible to adopt a method using an effective stabilizer. This method, however, is not practical because it requires a disadvantageous after-treatment of removing the added stabilizer.

Oxygen serves as a very effective polymerization-inhibiting agent for acrylamide. In fact, if the crude product solution is mixed with air by sparing sufficient time, the polymerization of acrylamide during the purification process can be considerably inhibited. However, this method requires the use of special equipment for steadily supplying and mixing oxygen and is complicated. Additionally, insoluble cupric hydroxide is formed by the oxidation of the cuprous ions with oxygen. This compound settles and chokes the columns of granular active carbon, the ion exchange resin column and so forth in the purification process.

Recently, in the manufacture of acrylamide through the reaction of acrylonitrile with water in the presence of a binary reduced copper catalyst a method of obtaining a prolonged life and selectivity of the catalyst by preventing the catalyst from contact with oxygen has been proposed (as disclosed in U.S. Pat. No. 3,642,894). However, this method cannot directly be adopted for the treatment of the aqueous crude acrylamide solution after the hydration reaction as contemplated in the present invention, because the former method and latter treatment are different in the proportion and concentration of the polymerizable substance, the concentration of by-products formed by the reaction, the coexistent active carbon or ion exchange resin and the conditions and purposes of the treatment.

BRIEF SUMMARY OF THE INVENTION

An object of this invention is to provide a method of treating an aqueous solution of crude acrylamide, which has been obtained by reacting acrylonitrile with water in the presence of a metallic copper catalyst and contains 1 to 1,000 ppm of cuprous ions, to obtain a purified acrylamide of high quality either in the form of an aqueous solution or in crystalline form.

Another object of this invention is to provide a method which prevents the polymerization of acrylamide and acrylonitrile in the aqueous crude acrylamide solution obtained by the aforementioned reaction and readily permits the separation of copper ions and other substances dissolved in the solution.

According to the method of this invention, an aqueous solution of crude acrylamide, which has been obtained by reacting acrylamide with water in the presence of a metallic copper catalyst and contains 1 to 1,000 ppm of cuprous ions, is treated by way of distillation, concentration, filtration, precipitation, active carbon treatment, crystallization and ion exchange while preventing the aqueous solution from contacting an oxygen-containing gas or liquid, whereby pure acrylamide of high quality in an aqueous solution or crystalline form is obtained. The above treatment can be carried out without any trouble stemming from polymerization.

The means for preventing the aqueous crude acrylamide solution from contact with an oxygen-containing gas or liquid is attained according to this invention by replacing the air in at least a part of the space in the apparatus for the relevant step by a gas other than air or gaseous oxygen, for instance, gaseous nitrogen or steam. Alternatively, this means is attained by replacing the air in the apparatus for the relevant step by previously deoxidized liquid or by filling the apparatus with a liquid and then deoxidizing the liquid prior to introducing the crude acrylamide solution. As a further alternative, the treatment in the relevant step is carried out while feeding a gas other than air or gaseous oxygen into the apparatus for that step.

By the aforementioned method according to the invention, it is possible to solve various problems inherent to the treatment of aqueous solutions of crude acrylamide obtained by the comparatively new catalytic hydration method. Besides, there is no need of adding a polymerization inhibitor for the treatment, and even where the use of a stabilizer is allowed the intended object of the treatment can fully be achieved with a small amount of a polymerization inhibitor.

DETAILED DESCRIPTION OF THE INVENTION

In accordance with this invention, there is provided a method of treating an aqueous solution of crude acrylamide obtained by catalytic hydration of acrylonitrile with water in the presence of a metallic copper catalyst. Various modifications have been made on catalysts for use in the aforementioned reaction, and the modified catalysts are roughly classed as follows:

1. Very small metallic copper mass in the form of powder and wire produced from metallic copper ingot.
2. Reduced copper obtained by reducing a copper compound such as an oxide, hydroxide or salt of copper with hydrogen or carbon monoxide at a temperature ranging from normal temperature to 500°C.
3. Reduced copper obtained by reducing a copper compound such as an oxide, hydroxide and salt of copper in a liquid phase with a reducing agent such as hydrazine or a borohydride, for example, sodium borohydride.
4. Reduced copper obtained by treating a copper compound such as an oxide, hydroxide and salt of copper in liquid phase with a metal having a larger ionizing tendency than copper, for instance, zinc, aluminum, iron or tin.
5. Raney copper obtained by developing a Raney alloy composed of aluminum, zinc or magnesium and copper.
6. Copper obtained by pyrolysis of a copper compound such as copper formate or copper oxalate at a temperature ranging 100°C to 400°C.
7. Multiplex catalyst or catalysts with carriers obtained by adding to any one of the above catalysts other metals such as chromium, zinc, nickel, manganese and molybdenum or carriers usually used for the modification of catalysts.

The various catalysts above mentioned differ in the intensity of activity, but not significantly in selectivity. If these catalysts are used under the aforementioned conditions for the catalytic hydration reaction of acrylonitrile, the selectivity to acrylamide is usually above 97 percent, and that to ethylenecyanohydrin is usually below 2 percent.

The aqueous solution of crude acrylamide obtained in this manner contains a considerable amount of copper ions, the majority of which exists as cuprous ion. Such aqueous crude acrylamide solution containing cuprous ion exhibits a very unique behavior, and in a distillation treatment chiefly for the purpose of stripping unreacted acrylonitrile, a concentration treatment for increasing the concentration of acrylamide, a filtration or precipitation treatment for removing solid matter such as catalyst particles or a small quantity of gel-like matter such as polymers, a treatment with active carbon for removing a coloring substance or an absorptive substance, a crystallization treatment for obtaining crystalline acrylamide or in an ion exchange treatment chiefly for the purpose of removing copper ions, it is important to avoid as much as possible the contact of the solution with an oxygen-containing gas or liquid, except where the solution is contacted with a gas containing an excessively large amount of oxygen. Otherwise, the production of acrylamide on an industrial scale will become impossible.

In the case of treating an aqueous solution of crude acrylamide with a cuprous ion concentration of 1 to 1,000 ppm, it is necessary to keep the cuprous ion stable until the copper ions existent in the solution are removed by an ion exchange treatment, although the reason therefore cannot clearly be explained. Preventing the solution from contacting an oxygen-containing gas or liquid is presumed to be effective for this purpose.

There are some effective methods that may be adopted for positively preventing the aqueous crude acrylamide solution from contacting an oxygen-containing gas or liquid. As has been mentioned earlier, one such method is to replace air in at least a part of the space in the apparatus for the relevant step by a gas other than air or gaseous oxygen prior to introducing the aqueous crude acrylamide solution into that apparatus. A second method is to replace air in the apparatus by a previously deoxidized liquid or replace the air by a liquid and then deoxidize the liquid prior to introducing the solution. A third method is to mix the solution with a previously deoxidized liquid. A fourth method is to carry out the treatment while introducing a gas other than air of gaseous oxygen into the apparatus. As the gas other than air or gaseous oxygen, an inactive gas such as gaseous nitrogen or steam is particularly effective. The liquid to be mixed with the aqueous crude acrylamide solution may be selected from water, an aqueous solution of acrylamide and acrylonitrile, and an aqueous solution of acrylonitrile depending upon the treatment.

The first and second methods mentioned above are effective where the aqueous crude acrylamide solution is introduced into the apparatus for the individual steps. The third method is effective in the case of rinsing the inside of the apparatus with a liquid, diluting the aqueous crude acrylamide solution with a liquid or cooling the aqueous crude acrylamide solution by mixing it with a liquid kept at normal temperature or below. The fourth method is effective not only for the individual treatment steps but also for intermediate steps for such treatment steps, for instance, when temporarily storing the processed liquid from the previous treatment step. This fourth method may also be adopted where the liquid resulting from the rinsing as mentioned above in connection with the third method is temporarily stored in a storage tank for recirculating to any of the preceding treatment steps.

For better understanding of the object, specific operation and effect of the method according to the invention, they will now be described in connection with the individual treatment steps.

DISTILLATION AND CONCENTRATION

Since the crude aqueous solution of acrylamide obtained by the reaction usually contains unreacted acrylonitrile sometimes with the residual solvent, it is frequently undertaken in the distillation step to separate these residual components and recirculate them back to the reactor so as to obtain a concentrated aqueous solution of acrylamide. The distillating apparatus is usually desired to be operated at a temperature and a pressure kept as low as possible from the standpoint of avoiding polymerization of the monomeric components. If the contact of the crude aqueous solution with air is prevented over the entire process from reaction till distillation including plural intermediate steps as in the method of this invention, the treatment can economically be operated at 50°–120°C (and hence under pressure of 50 Torr to 2 atm. depending upon the composition of the liquid), close to the normal pressure condition.

For avoiding the aqueous solution from contact with air, due considerations have to be paid to the equipment. For example, even in an apparatus operated under normal pressure, it has to be hermetically sealed or isolated from the atmosphere by means of an inactive gas such as nitrogen gas. Also, where a liquid obtained as a result of rinsing the apparatus for a different step is led to the distillating apparatus, due considerations are always necessary test the liquid should contact with air.

Similar considerations should also be paid in the case of a concentrating step without aiming at the separation of the residual acrylonitrile or solvent but with the sole purpose of increasing the concentration of acrylamide.

FILTRATION AND PRECIPITATION

The crude aqueous acrylamide solution obtained by the reaction usually contains such foreign matter as particles of the catalyst and, in some cases, a very small quantity of polymers. Such foreign matter is often separated through filtration or precipitation for repeated use or as waste. To facilitate the filtration, it is usually advantageous to reduce the viscosity of the solution and hence increase the operating temperature of the filter. By so doing, however, the possibility of polymerization is increased. Also, there is a structural detect that polymerization is liable to occur in a stagnant portion of the liquid.

So far as the contact with oxygen containing gas is sufficiently avoided, the polymerization of the aqueous crude acrylamide solution will hardly take place even if the filtering process is carried out at a high temperature of 100°–150°C. In contrast, where the aqueous crude acrylamide solution is once exposed to air, filtration at a temperature of at least 50°C is difficult. Besides, the liquid introduced into the apparatus is partly in the form of gel formed by conversion of the cuprous ion into cupric hydroxide. On filtration of such solution, the filter cloth or the so-called precoat layer is prone to loading. Also, where the filter is reused after removing the filter cake collected with its space filled with air or water containing air dissolved therein, polymers soluble in the processed solution are likely to be produced, leading to choking of the apparatus in the subsequent process.

Where precipitation is adopted instead of filtration, elevation of the operating temperature for facilitating the precipitation similarly leads to increased posibility of polymerization.

TREATMENT WITH ACTIVE CARBON

The treatment with active carbon is carried out for the purpose of decoloring the aqueous crude acrylamide solution or removing stabilizer or the like added to the starting acrylonitrile. Usually, however, polymerization of acrylamide is likely to take place in the vicinity of active carbon. It is quite likely that the processed solution is exposed to air or mixed with water containing air dissolved therein in a treating tank or filter containing powdery active carbon or in a treating column containing granular active carbon.

In the conventional method, therefore, polymerization of the monomers is prone to take place not only in the treatment with active carbon but also in the subsequent steps, for instance, distillation and ion exchange steps. According to the method of invention, this possibility can perfectly be eliminated.

CRYSTALLIZATION

Crystallized acrylamide is obtained from a concentrated aqueous solution of crude acrylamide by crystallization. This operation is advantageously carried out in the neighborhood of normal temperature from the standpoints of solubility and so forth. However, in this step, which constitutes the final step, and in which blending of a stabilizer with the crystal is detected for preventing deterioration of the quality of the product, the amount of a stabilizer is limited so that inhibition of polymerization is not so easy.

However, if the contact with air is sufficiently avoided as contemplated in this invention even in the case of an aqueous solution of acrylamide containing cuprous ion in a very small amount, for instance, about 2 ppm, the treatment of crystallization will easily be carried out to obtain high purity acrylamide crystals free from any polymer.

ION-EXCHANGE TREATMENT

Acrylamide is mainly used for manufacturing acrylamide polymers, and this manufacture is usually very significantly influenced by copper ions. Accordingly, the copper ion concentration in the acrylamide product either in the form of aqueous solution or in the form of crystal has to be made low enough, for example, below 1 ppm for pure acrylamide. Also, the concentration of ions other than copper is desired to be as low as possible to meet the quality of the product and other requirements.

For the removal of these salts it is convenient to use ion-exchange resins. However, acrylamide usually tends to undergo natural polymerization in the vicinity of various ion-exchange resins, and this tendency is more serious than that in the case of the vicinity of active carbon as mentioned earlier. Besides, the pronounced polymerization-inhibiting effect of the cuprous ions cannot be expected after the removal thereof in the ion-exchange resin layer. Therefore, the environment in this process is severer than in any other process similarly carried out in the neighborhood of normal temperature, thus leading to the introduction of polymers into the aqueous solution after the ion-exchange treatment and eventually the choking of the ion-exchange resin layer.

As the result of extensive research made to eliminate the above undesired phenomena, it has now been found that the polymerization of monomers can substantially be avoided by the method of this invention wherein the aqueous crude acrylamide solution removed from the reactor is prevented from contacting air or mixing with a liquid containing air dissolved therein over the whole process up to introduction the solution into the ion-exchange step.

To remove the copper ions or such cations as iron ions coming from the corrosion of apparatus, a sulfonate type cation exchange resin is suited from the standpoint of cost. Particularly, cation exchangers of free acid type (hereinafter referred to simply as H type) obtainable by regeneration of the above mentioned sulfonate type ones with a mineral acid are preferred because of their high copper ion exchange capacity and easiness of regeneration. The H type ion exchangers, have heretofore been thought to be unsuitable for practical use because polymerization is more likely to take place in this ion exchange resin layer as compared with other types of regenerated ion exchange resins such as Na type ones obtainable by regeneration with an aqueous solution of a sodium salt or $NH_4$ type ones obtainable by regeneration with an aqueous solution of an ammonium salt. By adopting the method of this invention, however, the H type ion exchange resin may be used without fear of polymerization that may otherwise take place.

The method of this invention is intended to be applied to any one of the individual treatment steps. In the treatment of an aqueous solution of acrylamide, even if one step, for instance, the treatment with active carbon proceeds smoothly without any grave trouble encountered, a subsequent step, for instance, the ion exchange treatment step, may be prone to a grave trouble stemming from the treatment in the previous step. Therefore, a sufficient effect of the method of this invention is attained only when all of the previous steps are carried out according to the method of this invention.

SPECIFIC EMBODIMENT

Example 1

A suspended bed type reactor made of a metal, with a capacity of 1 liter and provided with an agitator was prepared. The reactor also had a built-in catalyst separator of the precipitation type held at the same temperature as the reactor and was directly connected to a 80 liter confined vessel previously filled with nitrogen gas for collecting the liquid flowing from the reactor.

In this reactor were placed 500 g of a Raney copper catalyst obtained by developing a Raney copper alloy (Al : Cu = 1 : 1) with an alkali. Then, acrylonitrile and water were supplied at feed rates of 300 g/hr. and 700 g/hr., respectively, to the reactor and the reaction was conducted at a temperature of 100°C. The liquid discharged from the reactor was collected in the 80 liter vessel. This liquid contained about 20 weight percent of acrylamide and about 15 ppm of copper ions. A polarographic observation revealed that over 95 weight percent of the copper ions were in the form of cuprous ion. A solution state test conducted by adding 90 ml of methanol to 10 ml of the liquid showed that the solution state is transparent, indicating that no substantial polymeric acrylamide was produced.

A distilling apparatus made of glass and comprising a tower portion and a can portion (with a liquid inlet provided with a catalyst filter consisting of a filter cloth clamped between flanges and the can portion immersed in an oil bath at 120°C) was also prepared. The aqueous solution of crude acrylamide discharged from the reactor was directly supplied, without exposing it to the atmosphere, at a feed rate of 1 liter/hr. through the catalyst filter to the top of the tower portion of the distilling apparatus where unreacted acrylonitrile and a part of the water were distilled to obtain a concentrated aqueous acrylamide solution containing 33 weight percent of acrylamide. The concentrated liquid contained about 25 ppm of copper ions, 95 weight percent of which were in the form of cuprous ion. No polymeric acrylamide was detected. The distilling apparatus was operated under normal pressure, and the temperature of the concentrated liquid was about 104°C. This test was continued smoothly for 7 days.

Example 1A

50 Liters of the liquid remaining in the 80 liter vessel in Example 1 were withdrawn into air and allowed to stand there overnight, whereby a light blue-green gel of cupric hydroxide was precipitated. The cuprous ion concentration detected in the liquid was about 3 ppm. This liquid was subjected to distillation with the same apparatus and under the same condition as described in Example 1 and the resultant concentrated liquid was tested by the same methanol method as mentioned above to find that it contained too much polymeric acrylamide to be put into practical use. This test was continued for 4 hours under the flow through the catalyst filter was no longer smooth. Then, the test was stopped and the filter was inspected. The filter cloth was loaded with the cupric hydroxide gel.

Next, 50 liters of the concentrated liquid obtained in Example 1 were allowed to stand overnight while blowing air thereinto. As a result, the liquid became opaque and colored in blue green, indicating the formation of cupric hydroxide gel. The residual cuprous ion concentration was below 0.5 ppm. The liquid was passed at a rate of 600 ml/hr. and at a temperature of 40°C through a column, which had been prepared by filling a glass tube of 20 mm in diameter with 100 ml of "Amberlite IR-120B", regenerating it with an aqueous solution of edible salt and rinsing the ion exchanger with pure water, to obtain a slightly blue-greenish liquid. This liquid had a copper concentration of 2 ppm, indicating insufficient removal of copper.

As has been shown, when cuprous ion is converted into cupric ion, the resultant liquid has defects in polymerization stability, filtering property and ion exchange property.

Example 1B

A Raney copper catalyst obtained by developing a Raney copper alloy (Al : Cu = 1 : 1) with an alkali was placed in a 1 liter reactor made of a metal and provided with a catalyst separator and an agitator. Then, acrylonitrile and water were continuously supplied to a suspended bed of the reactor where the reaction was carried out at 120°C. The liquid discharged from the reactor was collected in a 80 liter confined vessel. Then, this liquid was passed through a distilling apparatus directly connected to the 80 liter vessel and operated under normal pressure for separating unreacted acrylonitrile through distillation. The resultant liquid was charged into a tank directly connected to the distilling apparatus and provided with an air vent, while returning the distilled liquid consisting of acrylonitrile and water to the reactor. The resultant liquid was charged into the tank at a rate of 400 ml/hr. The liquid contained about 50 weight percent of acrylamide and about 200 ppm of copper ions. The conversion of acrylonitrile into acrylamide was 98 percent, while that to ethylene cyanohydrin was 1 percent. A polarographic observation revealed that 95 percent of the copper ions were in the form of cuprous ion.

Next a column was prepared by filling a glass tube of 20 mm in diameter with 100 ml of a sulfonate type cation exchange resin, (trade name "Amberlite IR-120B"), regenerating it with diluted hydrochloric acid and washing the resin thoroughly with pure water. The aqueous crude acrylamide solution from the tank was supplied to the column at a rate of 400 ml/hr. to initiate the removal of cations such as copper ions. After lapse of about 10 minutes, the column was choked and the supply of the liquid could no longer be continued. An immediate inspection of the column showed that the liquid in the column had an increased viscosity, indicating that the acrylamide was polymerized. For the purpose of finding a suitable cation exchange resin, similar tests were conducted with similar sulfonic acid type ion exchange resins regenerated with an aqueous solution of edible salt and an aqueous solution of ammonium chloride, respectively. Both columns were choked due to polymerization of acrylamide soon after the passage of the liquid. Choking of the column due to the polymerization of acrylamide was similarly observed when using a carboxylic acid type cation exchange resin (trade name "Amberlite IRC-82") regenerated with hydrochloric acid. For the purpose of removing anions such as acrylic acid residue, similar tests were conducted by using a quaternary ammonium type anion exchange resin (trade name "Amberlite IRA-410") to find that choking of the column due to the polymerization soon takes place in each case of using the caustic soda regenerated resin and edible salt regenerated resin.

Example 2

In order that the liquid in the tank referred to in Example 1A was not contacted with air, nitrogen gas was blown into the tank, and also the column of a resin obtained by regenerating "Amberlite IR-120B" with hydrochloric acid was thoroughly washed with deoxygenated pure water with a dissolved oxygen concentration lowered to 2 ppm or less by blowing nitrogen gas. Then, the liquid was passed in the manner as mentioned in Example 1A to attain sufficient removal of copper ions and the like without any trouble resulting from polymerization. The copper ion concentration of the liquid was found to be 0.1 ppm. For the purpose of comparison, the blowing of nitrogen into the tank was stopped after continuing the passage of the liquid for 24 hours. After lapse of about 2 hours, the pressure at the inlet of the column began to increase gradually and the column was chocked due to the polymerization.

Two other columns were prepared, and one of them was rinsed with deoxygenated water to have a dissolved oxygen concentration of at most 2 ppm. With this column, the passage of the liquid was continued for 2 days. For the purpose of comparison, the passage of the liquid was then switched to the other column, which had been rinsed with non-deoxygenated water. With this column, choking of the column took place about 5 minutes after the switching.

Next, similar tests were conducted with resins obtained by regenerating "Amberlite IR-120B" with edible salt and with ammonium chloride, those obtained by regenerating "Amberlite IRC-84" with hydrochloric acid and those obtained by regenerating "Amberlite IRA-410" with caustic soda and with edible salt. It was found that choking of the column due to the polymerization could be avoided by blowing nitrogen into the tank and rinsing the column with deoxygenated water.

Example 3

300 Grams of cupric oxide in the form of tablets was charged into a 300-cc reaction tube made of a metal, and the cupric oxide was sufficiently reduced with hydrogen gas diluted to 2 percent with nitrogen to prepare reduced copper. Then, acrylonitrile and water were continuously supplied to this reaction tube where the reaction was conducted at 120°C. An aqueous solution of acrylamide containing unreacted acrylonitrile was obtained. This liquid was then passed through a distilling apparatus directly coupled to the reactor and operated under normal pressure for separating unreacted acrylonitrile by distillation. The resultant liquid was then charged into a nitrogen sealed tank directly connected to the distilling apparatus, while returning the distillate consisting of acrylonitrile and water back to the reactor. The resultant liquid from the distilling apparatus was collected in the tank at a rate of 500 ml/hr. The liquid contained about 50 weight percent of acrylamide and 250 ppm of copper ions. The conversion of acrylonitrile into acrylamide was 97 percent, while that into ethylene cyanohydrin was 2 percent. A polarographic observation revealed that over 95 percent of copper ions were in the form of cuprous ion.

Two columns were prepared by filling glass tubes of 20 mm in diameter with 100 ml of "Amberlite IR-120B", regenerating the "Amberlite" with diluted hydrochloric acid (hereinafter referred to as column A and column B). Column A was thoroughly rinsed with pure water deoxygenated to a dissolved oxygen concentration of at most 2 ppm. The liquid from the tank was then supplied to the column A at a rate of 500 m/hr. and at a temperature of 40°C. This column smoothly passed the liquid for 2 days without being choked due to polymerization. The copper ion concentration in the liquid was below 0.1 ppm.

On the other hand, the other column B was rinsed with non-deoxygenated pure water. About 10 minutes after the passage of the liquid was switched from the column A to the column B the latter column was choked due to polymerization.

Example 4

5 kg of a reagent grade copper powder were placed in a 10 liter metal reactor equipped with a catalyst separator and an agitator, and then acrylonitrile and water were continuously supplied to a suspended bed in this reactor where the reaction was conducted at 120°C. An aqueous solution of acrylamide containing unreacted acrylonitrile was obtained. This liquid was then passed through a distilling apparatus directly connected to the reactor and operated under normal pressure for separating the unreacted acrylonitrile by distillation. The resultant liquid was charged into a nitrogen sealed tank directly connected to the distilling apparatus, while returning the distillate consisting of acrylonitrile and water back to the reactor. The liquid was collected in the tank at a rate of 400 ml/hr. The liquid contained about 50 weight percent of acrylamide and 140 ppm of copper ions. The conversion of acrylonitrile into acrylamide was 97 percent, while that into ethylene cyanohydrin was 2 percent. A polarographic observation revealed that over 95 percent of the copper ions were in the form of cuprous ion.

The liquid from the tank was supplied at a rate of 400 ml/hr. and at a temperature of 40°C to a column, which was prepared by filling a glass tube of 20 mm in diameter with 100 ml of "Amberlite IR-120B", regenerating it with diluted hydrochloric acid and rinsing the resin with pure water deoxygenated with nitrogen gas to a dissolved oxygen concentration of at most 2 ppm. In this case, the passage of the liquid was steadily continued for 24 hours without the column being choked due to polymerization. For the purpose of comparison, 1 liter of the rinsing water obtained by rinsing a part of the apparatus with nondeoxygenated pure water was supplied to the distilling apparatus for mixing it with the test liquid. In this case, the ion exchange resin column was choked due to polymerization about 20 minutes after the mixing.

Example 5

3 kg of a Raney copper catalyst obtained by developing a Raney copper alloy (Al : Cu = 1 : 1) with an alkali were placed in a 10 liter metal reactor provided with a catalyst separator and an agitator, and then acrylonitrile and water were supplied respectively at rates of 3 kg/hr. and 7 kg/hr. to a suspended bed in the reactor where the reaction was conducted. The effluent from the reactor was conveyed to a reduced pressure distilling apparatus operated under an absolute pressure of about 300 mm Hg where unreacted acrylonitrile and a part of water were distilled off. The resultant aqueous solution of crude acrylamide was charged into a tank in a nitrogen atmosphere under atmospheric pressure. This solution was collected at a rate of 4 liter/hr., and it contained about 50 weight percent of acrylamide and about 200 ppm of copper ions. At least 95 percent of the copper ions were found to be in the form of cuprous ion.

A column was prepared by filling a steel tube of 55 mm in diameter with pure water and loading 0.7 kg of granular active carbon into the tube (this column being hereinafter referred to as active carbon column). This column was thoroughly rinsed by passing pure water. Also, another column was prepared by loading 200 ml of a sulfonic acid type cation exchange resin (trade name "Amberlite IR-120B") into a glass tube of 28 mm in diameter, regenerating it with diluted hydrochloric acid, and throughly rinsing the resin with pure water (this column being hereinafter referred to as ion exchange column).

The aforementioned aqueous crude acrylamide solution tank, a pump, the active carbon column and the ion exchange column were then connected in the mentioned order with pipes, and the ion exchange column was then filled with sufficient pure water having a reduced dissolved oxygen concentration of 2 ppm. Then, the aqueous crude acrylamide solution was passed through this system at a flow rate of 2 liters/hr. One hour after the passage of the liquid, the passage became difficult due to flow resistance, so that the passage was stopped. As a result of inspection, it was found that the ion exchange column was choked due to the polymerization of acrylamide.

Next, the granular active carbon in the active carbon column and the ion exchange resin in the ion exchange column was renewed, and similar columns as in the previous test were prepared. After filling each column with pure water having a reduced dissolved oxygen concentration of at most 2 ppm, the passage of the aqueous crude acrylamide solution at a rate of 2 liters/hr, was reopened. In this case, smooth passage could be continued for 24 hours, and the copper ion concentration in the liquid discharged from the ion exchange column was below 0.1 ppm. As the result of this test, it has been found that oxygen dissolved in water filled in the active carbon column induces the polymerization of acrylamide in the ion exchange column.

Example 6

In order to continue the run of the system in Example 5 for a long period of time, two active carbon columns and two ion exchange columns were prepared, so that the active carbon columns might be switched every 5 days, with the active carbon in the replaced column renewed for the next use, while switching the ion exchange columns every 2 days, with the replaced column regenerated for the next use.

Then, a test similar to that described in the latter part of Example 5 was initiated. After 5 days, the active carbon column was replaced. In order to take out active carbon from the active carbon after use, pure water was used for rinsing, and the resultant discharged water was directly passed to the ion exchange column in use. Choking of the ion exchange column due to the polymerization of acrylamide soon took place.

A similar test was performed except that the column was washed with pure water having a reduced dissolved oxygen concentration of at most 2 ppm. In this case, choking of the ion exchange column due to the polymerization did not take place.

From the tests in this Example it was found that in case the liquid used for rinsing the active carbon column was introduced into the ion exchange column, oxygen contained in this liquid would induce the polymerization of acrylamide in the ion exchange column.

Example 7

A 20 liter vessel was connected to the aqueous crude acrylamide solution tank in Example 5, and an aqueous crude acrylamide solution having an acrylamide concentration of 50 percent was introduced into the vessel by evacuating it with a vacuum pump until the vessel was substantially completely filled with the solution. Then, it was hermetically sealed after closing its inlet and outlet. After leaving this vessel in an atmosphere at about 0°C for 24 hours, the supernatent liquid was withdrawn from the vessel to collect the precipitated crystals. This liquid had a slightly increased viscosity, indicating that the polymerization of acrylamide took place.

A similar test was performed as described above except that the 20-liter vessel was connected to the tank after filling the vessel with nitrogen gas. In this case, no polymerization was recognized and polymer-free crystals could be taken out.

The same 20-liter vessel was connected to the aqueous crude acrylamide solution tank after filling the vessel with nitrogen. The aqueous crude acrylamide solution was then introduced into the vessel by evacuating it with a vacuum pump until the vessel was almost completely filled with the solution. The solution was then transferred to another 20-liter vessel and allowed to stand for 24 hours in a room kept at about 0°C. No polymerization was noted and crystals free from polymer were obtained.

From the tests in this Example it was found that air in the vessel would induce the polymerization of a acrylamide.

What is claimed is:

1. In a method of purifying an aqueous solution of acrylamide containing from 1 to 1,000 ppm of cuprous ions wherein said aqueous solution is subjected to at least one of the steps of distillation, concentration, filtration, precipitation, treatment with active carbon, crystallization and ion-exchange treatment, the improvement wherein at least one of said steps is preformed in a manner that said aqueous solution does not come in contact with an oxygen containing gas or liquid.

2. A method according to claim 1 wherein said aqueous solution is formed by reacting acrylonitrile with water in the presence of a metallic copper catalyst.

3. A method according to claim 1 wherein said aqueous solution is prevented from contacting an oxygen-containing gas or liquid until all of said steps are completed.

4. A method according to claim 2, wherein said aqueous solution is prevented from contacting any oxygen-containing gas or liquid by filling at least a part of the space in the apparatus used for said at least one of said steps with a gas other than air or gaseous oxygen prior to introducing said aqueous solution into the apparatus.

5. A method according to claim 4, wherein said gas other than air or oxygen is gaseous nitrogen or steam.

6. A method according to claim 2, wherein said aqueous solution is prevented from contacting an oxygen-containing gas or liquid by filling the space in the apparatus used for said at least one of said steps with a deoxygenated liquid prior to introducing said aqueous solution into the apparatus.

7. A method according to claim 6, wherein said deoxygenated liquid is water, an aqueous solution of acrylamide, acrylonitrile or an aqueous solution of acrylonitrile.

8. A method according to claim 2, wherein said aqueous solution is prevented from contacting an oxygen-containing gas or liquid by mixing said aqueous solution of acrylamide with a deoxygenated liquid before said aqueous solution is introduced into the apparatus used for said at least one of said steps.

9. A method according to claim 8, wherein said deoxygenated liquid is water, an aqueous solution of acrylamide, acrylonitrile and an aqueous solution of acrylonitrile.

10. A method according to claim 2, wherein said aqueous solution is prevented from contacting an oxygen-containing gas or liquid by carrying out said at least one of said steps while feeding a gas other than air or gaseous oxygen into the apparatus used in that step.

11. A method according to claim 10, wherein said gas other than air or gaseous oxygen in gaseous nitrogen or steam.

12. A method according to claim 2, wherein the active carbon treatment of said aqueous solution is carried out while preventing said aqueous solution from contacting an oxygen-containing gas or liquid.

13. A method according to claim 2, wherein the ion exchange treatment of said aqueous solution is carried out while preventing said aqueous solution from contacting an oxygen-containing gas or liquid.

14. A method according to claim 2, wherein the active carbon treatment and the ion exchange treatment of said aqueous solution are carried out while preventing said aqueous solution from contacting an oxygen-containing gas or liquid.

15. A method according to claim 2, wherein the distillation, concentration and filtration or precipitation treatments of said aqueous solution are carried out while preventing said aqueous solution from contacting an oxygen-containing gas or liquid.

16. A method according to claim 2, wherein the crystallization treatment of said aqueous solution is carried out while preventing said aqueous solution from contacting an oxygen-containing gas or liquid.

17. A method according to claim 1, wherein the ion exchange treatment of said aqueous solution of crude acrylamide is carried out while preventing said aqueous solution from contact with an oxygen-containing gas or liquid in all the treatments until the ion exchange is finished.

18. A method according to claim 2, wherein an aqueous solution of crude acrylamide containing 5 to 500 ppm of cuprous ion is treated by way of distillation, filtration and ion exchange treatments as well as intermediate treatments for these treatments, while preventing said aqueous solution from contacting an oxygen-containing gas or liquid throughout these treatments.

* * * * *

UNITED STATES PATENT OFFICE
CERTIFICATE OF CORRECTION

Patent No. 3,941,837        Dated March 2, 1976

Inventor(s) Shiro Asano, Kiyotaka Yoshimura and Masao Hashimoto

It is certified that error appears in the above-identified patent and that said Letters Patent are hereby corrected as shown below:

Column 1, line 41, "784,799" should read --784,799--. Column 2, line 1, "polmerized" should read --polymerized--. Column 4, line 50, "of" should be --or--. Column 5, line 39, "test" should be --lest--. Column 8, line 40, "under" should be --until--. Column 12, line 37, after "carbon" (second occurrence) the word --column-- should appear. Claim 11, line 2 "in" should be --is--.

Signed and Sealed this

Third Day of August 1976

[SEAL]

Attest:

RUTH C. MASON  
Attesting Officer

C. MARSHALL DANN  
Commissioner of Patents and Trademarks